(12) United States Patent
Dumm

(10) Patent No.: US 7,732,058 B2
(45) Date of Patent: *Jun. 8, 2010

(54) LUBRICIOUS COATINGS

(75) Inventor: Timothy Francis Dumm, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/532,357

(22) Filed: Sep. 15, 2006

(65) Prior Publication Data

US 2007/0009731 A1 Jan. 11, 2007

Related U.S. Application Data

(63) Continuation-in-part of application No. 11/377,777, filed on Mar. 16, 2006, now Pat. No. 7,562,858.

(60) Provisional application No. 60/662,292, filed on Mar. 16, 2005.

(51) Int. Cl.
B32B 15/02 (2006.01)
B32B 3/26 (2006.01)
B22F 1/02 (2006.01)

(52) U.S. Cl. .................. 428/545; 428/548; 428/304.4; 427/214; 106/122

(58) Field of Classification Search ............... None
See application file for complete search history.

(56) References Cited

U.S. PATENT DOCUMENTS

| 3,244,497 A | 4/1966 | Copeland | |
| 3,762,882 A * | 10/1973 | Grutza | 428/615 |
| 3,919,717 A | 11/1975 | Cullen et al. | |
| 3,936,577 A | 2/1976 | Christini et al. | |
| 4,139,677 A | 2/1979 | Blair et al. | |
| 4,168,961 A | 9/1979 | Blair | |
| 4,243,728 A | 1/1981 | Sato et al. | |
| 4,328,266 A | 5/1982 | Feldstein | |
| 4,547,407 A | 10/1985 | Spencer, Jr. | |
| 4,681,817 A | 7/1987 | Shinada | |
| 4,741,973 A * | 5/1988 | Condit et al. | 428/553 |
| 4,747,864 A | 5/1988 | Hagerty et al. | |
| 4,906,532 A | 3/1990 | Spencer, Jr. | |
| 4,997,686 A | 3/1991 | Feldstein et al. | |
| RE33,767 E | 12/1991 | Christini et al. | |
| 5,136,198 A * | 8/1992 | Shibuya | 310/251 |
| 5,145,517 A | 9/1992 | Feldstein et al. | |
| 5,302,450 A | 4/1994 | Rao et al. | |
| 5,434,210 A * | 7/1995 | Rangaswamy et al. | 524/406 |
| 5,482,637 A | 1/1996 | Rao et al. | |
| 5,595,639 A | 1/1997 | Sano et al. | |
| 6,162,497 A * | 12/2000 | Beane et al. | 427/215 |

(Continued)

FOREIGN PATENT DOCUMENTS

EP  0 382 993  *  8/1990

(Continued)

Primary Examiner—Jennifer McNeil
Assistant Examiner—Jason L Savage
(74) Attorney, Agent, or Firm—Maria C. Gasaway

(57) ABSTRACT

A coating includes a porous a first layer comprising metal coated solid lubricant particles partially fused together. A second layer comprising a metal or a composite that conforms to the surface topography of the first layer.

6 Claims, 4 Drawing Sheets

U.S. PATENT DOCUMENTS

| | | |
|---|---|---|
| 6,254,461 B1 | 7/2001 | Benning et al. |
| 6,309,583 B1 | 10/2001 | Feldstein |
| 6,314,763 B1 | 11/2001 | Sakamoto |
| 6,314,764 B1 | 11/2001 | Sakamoto |
| 6,868,699 B2 | 3/2005 | Oiwa et al. |
| 2003/0005725 A1 | 1/2003 | Oiwa et al. |
| 2005/0022457 A1 | 2/2005 | Chen et al. |
| 2005/0112399 A1* | 5/2005 | Gray et al. .................. 428/678 |
| 2005/0173834 A1 | 8/2005 | Lucek et al. |
| 2006/0208151 A1* | 9/2006 | Dumm et al. ............ 249/114.1 |

FOREIGN PATENT DOCUMENTS

| | | | |
|---|---|---|---|
| EP | 1 010 674 | | 6/2000 |
| EP | 1508693 | * | 8/2004 |
| GB | 835673 | | 5/1960 |
| GB | 1 333 055 | | 10/1973 |
| GB | 2247232 | * | 7/1991 |
| JP | 56-119752 | * | 2/1980 |
| JP | 56-160378 | * | 5/1980 |
| JP | 05-051603 | * | 8/1991 |
| WO | WO 00/60137 | | 10/2000 |
| WO | WO 2004/094685 | | 11/2004 |
| WO | WO 2005/002742 | | 1/2005 |

* cited by examiner

LUBRICIOUS COATINGS

CROSS-REFERENCE TO RELATED APPLICATIONS

This patent application is a continuation-in-part of and claims priority to U.S. patent application Ser. No. 11/377,777, filed Mar. 16, 2006, now U.S. Pat. No. 7,562,858 entitled "Wear and Texture Coatings for Components Used in Manufacturing Glass Light Bulbs," which claimed priority to U.S. provisional patent application No. 60/662,292, filed Mar. 16, 2005, entitled "Wear And Texture Coatings For Components Used In Manufacturing Glass Light Bulbs," the disclosures of which are incorporated herein by reference in their entireties.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the field of coatings on a substrate. In particular the disclosed embodiments relate to semi-permanent wear resistant coatings that exhibit lubricious and release properties. While not to be limiting, the coating embodiments disclosed herein are well suited for use in molten glass delivery and molding components.

2. Description of the Related Art

Molded articles such as glass lenses, screen panels for televisions, etc., require refracting surfaces of precise configuration and a high degree of surface smoothness. With respect to other glass articles such as glass bottles, containers, and the like, the requirement for surface smoothness is not as stringent, but there is a common requirement for the molding to be done at high temperatures of about 500° C. or higher. Accordingly, the mold to be used for glass forming must have chemical and physical properties such as mechanical strength, heat resistance, and chemical stability against the high temperature molten glass, as well as other characteristics such as surface roughness, surface precision, and reliable release.

Molten glass is also transported from the melting furnace to the forming operation. Depending on the product the molten glass may move as continuous sheets, ribbons, discrete molten bodies, gobs, and partially formed components or parisons. In order to maintain consistent timing and transportation performance, coatings are applied to the handling component surfaces. Common coatings contain graphite particles in an epoxy resin. These coatings can last from a few days to several weeks of continuous duty. It may be necessary to augment the coatings with oil that is sprayed or swabbed onto surfaces as often as every 30 minutes.

There are several significant disadvantages in lubricating molds or transportation components, either by hand or automatically. Hand swabbing, aside from being hazardous, requires application of lubricant at a time when the cycle of the machine mechanism permits. Mechanized spray units complicate the cycle of the machine and require that the mold parts to be lubricated be made accessible for insertion of a spray nozzle and time allowed for spraying and removal of the nozzle before beginning the forming cycle again.

In the application of a release agent or lubricant to a mold surface by hand or an automated sprayer station, one or more cycles of molding may be missed because of the time required for the swabbing or spraying operation. Sprayer stations add to the cost and maintenance of the molding process. These combine to decrease productivity, increase costs, and may result in non-uniform, excessive or incomplete lubrication of the mold parts.

Several patents describe prior attempts to address these problems. For example, U.S. Pat. No. 5,595,639 teaches coating the inner surface of the glass-forming mold a nickel or nickel-based alloy composition comprising chiefly nickel and graphite granules. U.S. Pat. No. 4,747,864 discloses glass-forming molds coated with an optically smooth titanium nitride surface. U.S. Pat. No. 4,168,961 discloses molds having molding surfaces of a silicon carbide/glassy carbon mixture. U.S. Pat. No. 3,244,497 discloses glass forming mold parts having surfaces coating with refractory nitrides, carbides, oxides, borides and boride complexes. U.S. Pat. No. 4,139,677 proposes a molding surface of silicon carbide or silicon nitride. U.S. Pat. Pub. No. 2003/00005725 teaches coating the mold with a chromium-plated coating film and subsequently a coating containing a silicon compound. U.S. Pat. Nos. 3,936,577 and RE33,767 disclose methods for concomitant particulate diamond deposition in a metal by electroless plating on substrates. U.S. Pat. No. 4,906,532 discloses particulate diamond composite coatings for textile tools by electroless deposition where the diamond has at least two nominal sizes. U.S. Pat. No. 6,309,583 teaches a method of making composite coatings with enhanced thermal properties by electroless deposition that includes diamonds. All of the references listed in this paragraph are incorporated into the present disclosure in their entirety by reference.

In most modern, high-production glass container factories today, there are several types of coatings used for maintaining lubricity and release properties. In most of these coatings, the primary release agent is graphite. Graphite lends itself well to the glass industry because it does not decompose at the temperatures where glass is molten and it maintains a high degree of lubricity over time. However, it is a soft material and is easily abraded away in relatively short periods of time usually minutes to hours.

There is a general need for coatings having improved wear and release properties, and a specific need for such coatings for use in glass mold components.

The disclosure contained herein describes attempts to address one or more of the problems described above.

SUMMARY

Wear resistant lubricious coatings for a substrate are claimed and disclosed. In various embodiments, the wear-resistant lubricious coatings may be porous, have an open structure, and may be capable of retaining liquids. Certain coating embodiments herein may be particularly suited for the glass forming industry.

In an embodiment, a coating comprises a plurality of metal-coated solid lubricant particles that are partially fused together. The coating has a surface topography that includes a plurality of pores. A metallic overlayer that substantially conforms to the surface topography. The solid lubricant particles may comprise, for example, graphite, hexagonal boron nitride, molybdenum disulfide, tungsten disulfide, mica, silver sulfate, cadmium iodide, lead iodide, fluorinated solids, copper, silver, nickel, lead, tin, indium, white lead, lime, talc, bentonite, a metallic salt, or mixtures thereof. In one embodiment, the metal coated solid lubricant particles include nickel coated graphite particles. The metal coated solid lubricant particles may have a second layer of metallic coating that may include, for example, nickel, chrome, cobalt, or copper, or alloys thereof. The second layer also may comprise superabrasive particles, abrasive particles or other particles. In various embodiments, the pores between coated solid lubricant particles may comprise between about 20 and about 70 volume-percent of the coating.

In an alternate embodiment, a coated article includes a substrate and solid lubricant particles having a first metallic overlayer. The particles are held in place by fusing of the metal overlayer. The lubricant particles and first metal overlayer form a coating on the substrate. The coating has a plurality of pores that for a surface topography. A second layer substantially retains the porosity of the coating. The solid lubricant particles may comprise, for example, graphite, hexagonal boron nitride, molybdenum disulfide, tungsten disulfide, mica, silver sulfate, cadmium iodide, lead iodide, fluorinated solids, copper, silver, nickel, lead, tin, indium, white lead, lime, talc, bentonite, a metallic salt, or mixtures thereof. The first metallic overlayer may comprise, for example, nickel, chrome, cobalt, or copper, or alloys thereof. The second layer may comprise, for example, nickel, chrome, cobalt, or copper, or alloys thereof. The second layer may further comprise superabrasive particles. The pores of the surface topography and pores within the coating may comprise between about 20 and about 70 volume-percent of the coating.

In an alternate embodiment, a method of coating a substrate includes applying metal coated solid lubricant particles onto a substrate to provide a porous coating layer on the substrate, and co-depositing a second metallic layer over the thermal sprayed metal coated solid lubricant particles. In some embodiments, the applying comprises thermal spraying the metal coated solid lubricant particles onto the substrate. In some embodiments, the co-depositing comprises plating and/or causes the second metallic layer to substantially retain pores of the porous coating layer.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
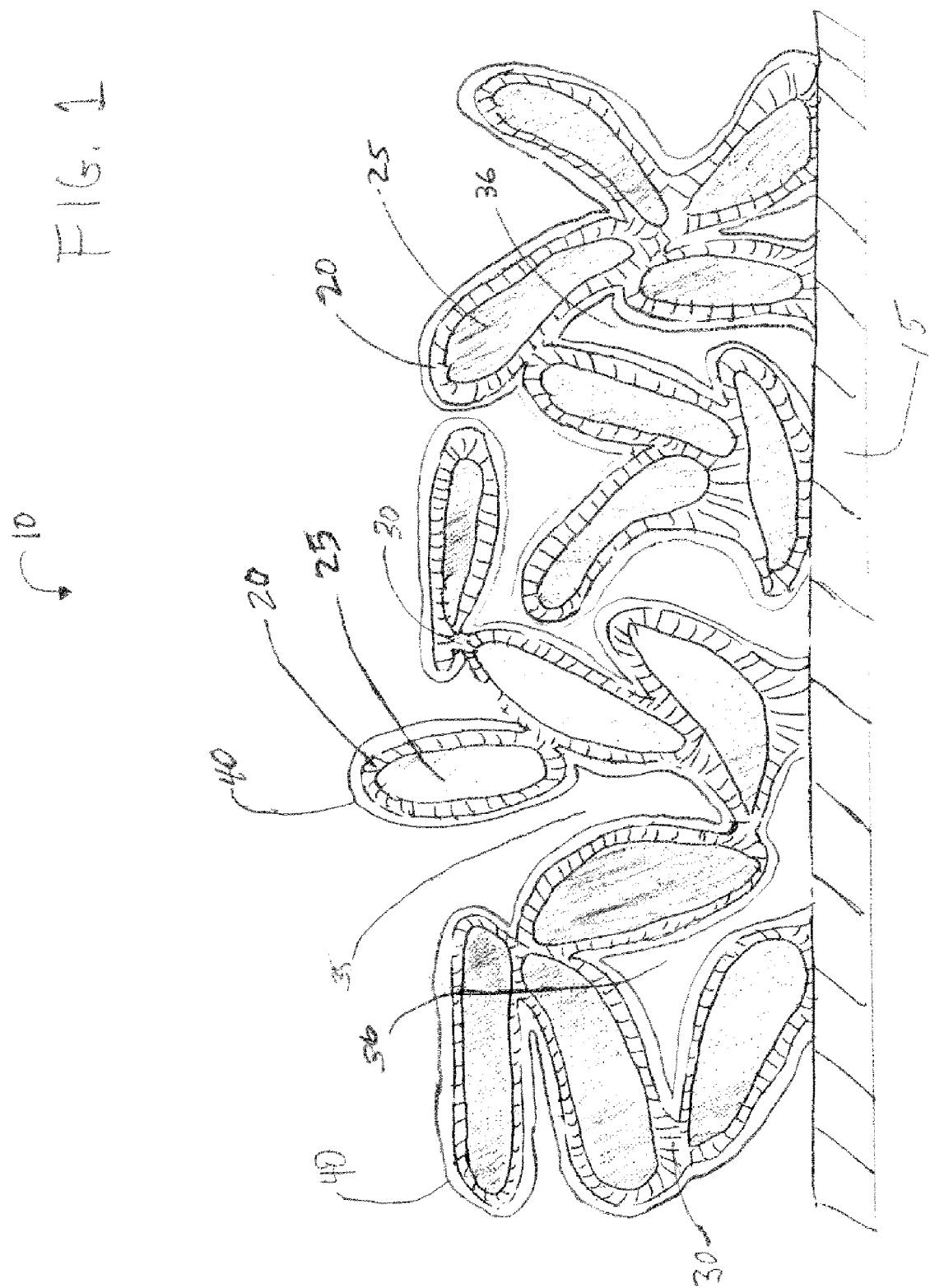
FIG. 1 depicts a cross section of a coating of solid lubricant particles having first and second metallic overlayers.

Referring to FIG. 1 an embodiment of a coating 10 on a substrate 15 is depicted. In an embodiment, the substrate 15 may comprise a metal or metal alloy, for example, but not limited to: alloy steel, such as stainless steel; nickel alloys, such as MONEL® (Inco Alloys International, Inc.) and INCONEL® (Huntington Alloys Corporation); aluminum alloys; and free-machining metals such as, but not limited to, aluminum. This listing of metals and their alloys is not meant to be limiting with respect to the substrate. It is recognized that substrates composed of various materials, such as, but not limited to, ceramic, plastics, rubbers, glasses, composites, and others are encompassed in the embodiments herein.

Still referring to FIG. 1, an exemplary embodiment of a coating to includes solid lubricant particles 25 with a first layer coating comprising metal 20. The solid lubricant particles 25 with the first layer coating of metal 20 may be partially fused together at various metal coated particle contact points 30. The coating 10 may have a surface topography, and in an embodiment, the coating 10 may include pores 35 and 36. The pores may include recesses or outer pores 35 making up a surface topography, and they may include interior pores 36 that are below the surface of the coating. Thus, the metal-coated lubricant particles are effectively contained within a porous metal matrix. In various embodiments, the coating 10 may have an average thickness of about 1 µm to about 100 µm, or between about 25 µm and about 100 µm, greater than 25 µm, up to 500 µm, or substantially the thickness of a monolayer of coated lubricant particles. Other thicknesses are possible.

In embodiment, the particles 25 may have a second coating layer 40 that also comprises a metal. In various embodiments, the addition of a metallic second layer 40 does not significantly alter or change the porosity of the first layer. The metal of the second layer 40 conforms to, or substantially takes the shape of, the surface topography or outer pores 35 of the coating so that it substantially covers the first metallic layer and substantially retains the porosity of the coating structure. The second layer may also cover some or all of the accessible surfaces of the interior pores 36. In an embodiment, the pores 35 and 36 are not occluded by the metallic second layer 40, and at least some of the outer pores 35 remain open to the environment after addition of the second layer 40. In another embodiment, the pores 35 and 36 may comprise a volume percent of between about 20% to about 70% of the coating 10.

As noted above, the metal coated solid lubricant particles 25 may be partially fused together at metal coated particle contact points 30. While not wanting to be held or limited by any particular theory, the particles 25 may be fused together by mechanical interlocking, and diffusion bonding, and/or metallurgical bonding, wherein the metallic layer at least partially melts, joins together as it hardens, and causes the particles to be held in place within the metallic layer. These bonding mechanisms are known to those skilled in the art, and need not be defined here. Any mechanism of bonding that fuses the metal coated particles together at coated particle contact points 30 is encompassed in the embodiments herein.

Solid lubricant particles 25 for embodiments herein may include, but are not limited to, single or multi-particle materials such as layered lattice solids, such as graphite, hexagonal boron nitride, molybdenum disulfide, tungsten disulfide, mica, silver sulfate, cadmium iodide, lead iodide; fluorinated solids, such as Teflon®; low shear strength solids such as copper, silver, nickel, lead, tin, indium, white lead, lime, talc, bentonite; metal salts, such as silver iodide; and mixtures thereof.

The solid lubricant particles 25, in various embodiments, may have an average particle size of about 0.1 μm to about 1000 μm, about 10 μm to about 500 μm, about 50 μm to about 150 μm, or other sizes. Each of the first metallic layer 20 and the second metallic layer 40 may have an average thickness of about 0.1 μm to about 500 μm, about 1 μm to about 100 μm, at least 25 μm, or other sizes. It is recognized that the particle size and metallic layer thickness ranges listed supra are not limiting, and other particle sizes and layer thicknesses are encompassed in embodiments described herein.

In various embodiments, the metals of the first layer 20 and the second layer 40 may include metals such as nickel, chrome, cobalt, or copper, or alloys thereof. In some embodiments, the first layer and the second layer may comprise the same metal, while in other embodiments they may comprise different metals or different combinations of metals. In an embodiment the first layer metal coating 20 may comprise about 50% by weight to about 85% by weight of the metal coated 20 solid lubricant particles 25. Other ratios of metal coating to solid lubricant are encompassed in the embodiments herein.

Metal coated solid lubricant particles suitable for embodiments herein include, but are not limited to commercially available products from Sulzer Metco, for example, under trade names Durabrade, Metco 307 and 308 and E-Fill.

The metal coated particles may be applied to the substrate using any method that produces a porous coating. In an embodiment, the metal coated 20 solid lubricant particles 25 may be applied to the substrate as a thermal spray coating. Thermal spray coatings, also referred to as flame spray coatings, are known to those skilled in the art. Briefly, a thermal spray coating is one produced by a process in which molten or softened particles are applied by impact onto a substrate.

After the coated metal particles are applied to the substrate, the second coating layer 40 may be applied to the coated particles using any method of co-depositing that allows the coating to remain porous. The term "co-depositing" as used herein may refer to the deposition of a metallic coating or the deposition of a composite coating, such as the simultaneous deposition of particles dispersed in a metal matrix. For example, the second coating layer 40 may be a plated layer. In various embodiments, a plated layer may be an electroplated layer, or alternatively, the plated layer may be an electroless, or autocatalytic, plated layer. Techniques for the electroplating and for the electroless plating of metals are well known to those skilled in the art, and any plating technique known now or hereafter to one of ordinary skill in the art is encompassed by the embodiments herein for the second layer 40.

Figure 2:
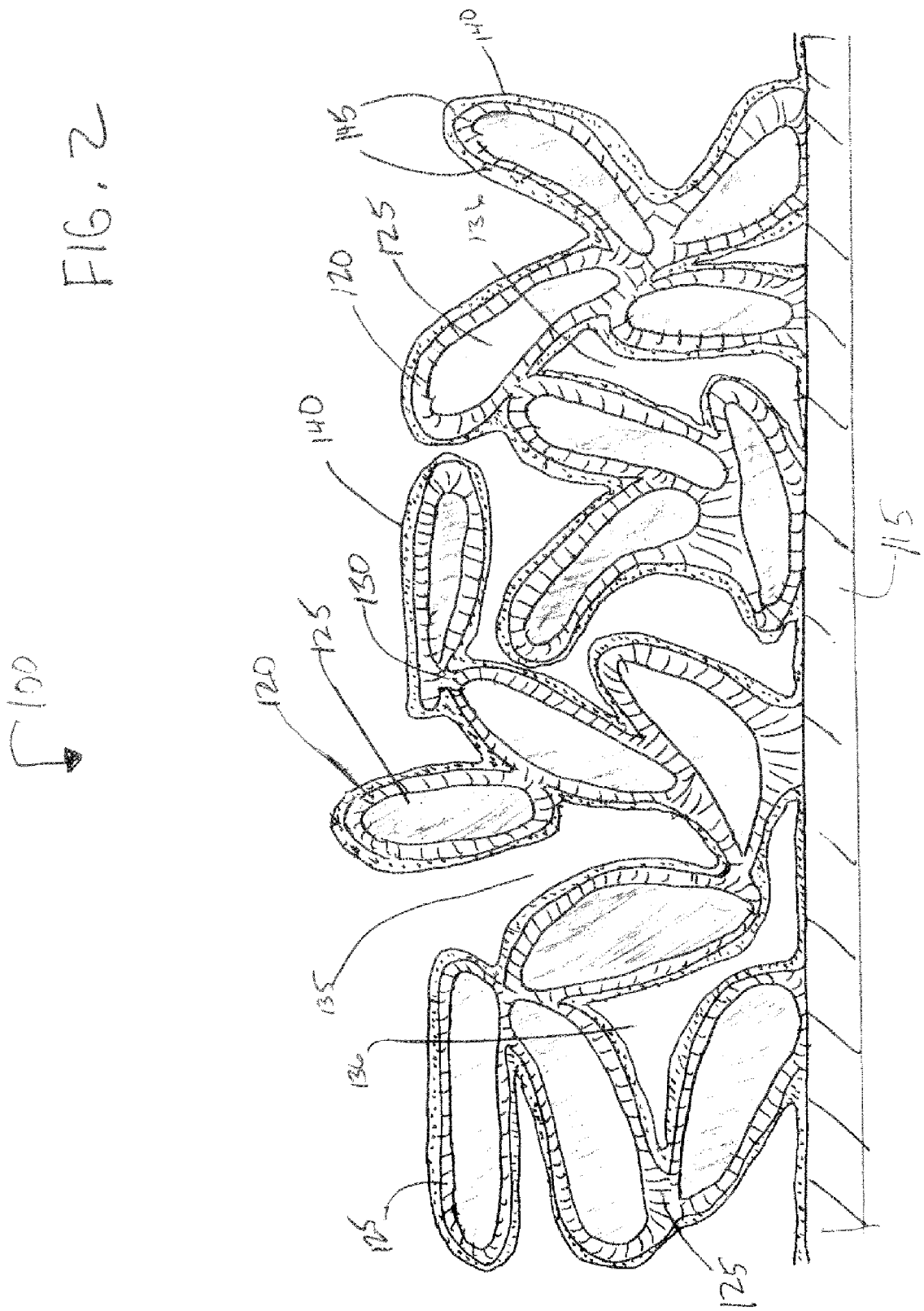
FIG. 2 depicts a cross section of a coating of solid lubricant particles having a first layer and second composite layer.

Referring now to FIG. 2, another exemplary embodiment of a coating 100 on a substrate 115 is presented. In an embodiment, the coating 100 includes a first layer comprising solid lubricant particles 125 coated with a first metallic layer 120 and partially fused together at metal coated particle contact points 130. The coating still has a surface topography containing outer pores 135, as well as inner pores 136. A second layer 140 comprises a composite material that conforms to the surface topography 135 of the coating. Options for the composition, structure, and size of the particles 125 and the first coating layer 120 included in the coating 100 (FIG. 2) are identical to those embodiments of the first layer and particles of embodiments of coating 10 (FIG. 1), disclosed supra, and reference is made to the disclosure above of the first layer and particle embodiments of coating 10 for embodiments of the first layer of coating 100.

Again referring to FIG. 2 in embodiments of a coating 100, the particles 125 may include a second coating layer 140 comprising a composite that substantially conforms to the surface topography of the first layer 120, and it also may coat accessible surfaces of the interior pores 136, thus coating surfaces of the first layer while retaining the porosity of the coating structure. In an embodiment, the composite of the second layer may include particles 145 dispersed in a metal matrix 150. The metal matrix 150 of the second layer 140 composite may include, but is not limited to, nickel, chrome, cobalt, or copper, or alloys thereof. The second layer composite 145 may include any variety of particles 145 dispersed throughout the metal matrix. For example, the particles 145 may include superabrasive particles, abrasive particles, and mixtures thereof. In an embodiment, the particles 145 may include superabrasive particles such as synthetic diamond, natural diamond, cubic boron nitride, and mixtures thereof. A superabrasive material is any material having a Vickers hardness of greater than about 3000 Kg/MM$^3$, or optionally more than about 3200 Kg/MM$^3$. Any superabrasive particles known now or hereafter to those skilled in the art are within the scope of the embodiments herein. Superabrasive particles of embodiments herein may have a diameter of about 0.1 μm to about 10 μm, about 2 μm to about 8 μm, or other sizes. The particles 145 may also include for example, but not limited to, Teflon® and other polymers, solid lubricants, corrosion inhibitors, pigments, and mixtures of particles. The second coating layer 140 may have an average thickness of about 0.1 μm to about 500 μm, about 1 μm to about 100 μm, at least 25 μm, or other sizes.

The metal coated particles may be applied to the substrate using any method that produces a porous coating, such as by a thermal spray method. The second layer may be co-deposited on and within the coating using any method that permits the coating to remain porous, such as by plating. Methods of producing plated composite layers, which include a plated layer of a metal with dispersed particles, are generally described in, for example, U.S. Pat. Nos. 4,997,686 and 5,145,517, the disclosures of which are incorporated herein by reference in their entirety.

In some embodiments, the addition of the composite second layer 145 does not significantly alter or change the porosity of the first layer 120. The composite of the second layer 145 substantially conforms to, or takes the shape of the surface topography or outer pores 135 of the first layer coating, and it also may conform to or substantially coat accessible surfaces of interior pores 136. In an embodiment, most of the pores 135 and 136 are not significantly occluded by the composite second layer 140, and the outer pores 135 remain open to the environment after addition of the second layer 145. In another embodiment, the pores 135 and 136 may comprise a volume percent of the coating 100 between about 20% to about 70%.

Figure 3:
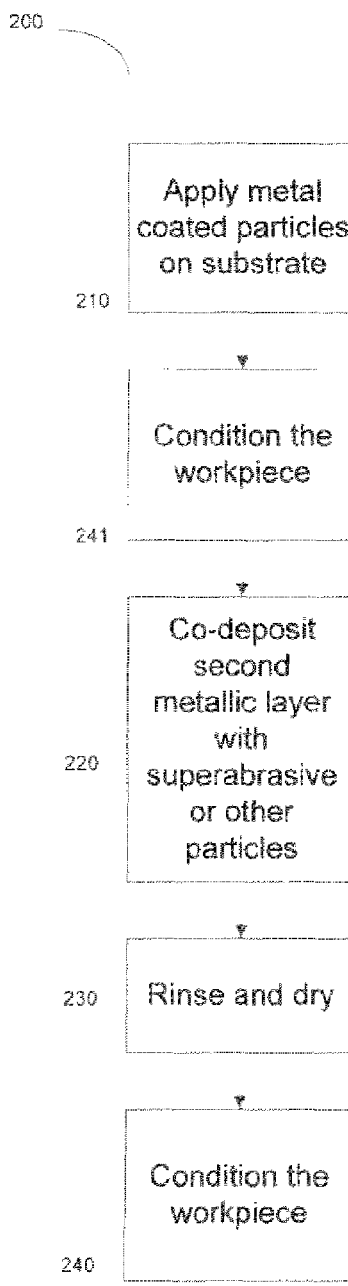
FIG. 3 depicts a flow diagram of an exemplary method of producing a coating embodied herein.

Referring now to FIG. 3, an exemplary method 200 of producing a coating on a substrate includes applying 210 metal coated lubricant particles to a substrate using any method that permits the metal coated particles to provide a porous coating layer, such as by thermal spraying the metal coated solid lubricant particles onto the substrate. Thermal spraying may include any coating or welding process in which metal-coated particles are deposited in a molten or semi-molten condition to form a coating, such as a heat-and-spray or flame spray method.

A second metallic layer may then be co-deposited 220 over the metal-coated solid lubricant particles so that the coating layer remains porous. Optionally, the second metallic layer includes superabrasive, abrasive, or other particles within a metallic matrix. Any suitable co-depositing method may be used, such as electroplating or electroless plating. Optionally, after coating, the workpiece may be rinsed with any suitable liquid and dried 230, either by air or with the assistance of moderate heat.

In addition, it may be desirable to condition the workpiece 240 or 241. Conditioning may include further mechanical or chemical treatment. In an embodiment, conditioning may include abrasion of a portion of the first metallic layer (before the application of the second layer as shown in step 241), or abrasion of the second layer (as shown in step 242), or both, in order to expose portions of the solid lubricant particles to the environment, and thus increase the lubricity and release characteristics of the coating. In some embodiments, this may be achieved by rubbing sand-paper or fine-grinding or honing stone over the surface of the coating. Other methods of abrading a coating are known to those skilled in the art. This embodiment may also reduce or eliminate any high asperities that might be present on the coating.

In various embodiments, wear equipment, such as that used in glass forming, such as, but not limited to, gob deflectors, blank molds, finish molds, neck rings, baffles, bottom plates, plungers, gob knives, pocket rolls, and orifice plates may be coated with the embodiments herein. Other surfaces and substrates also may be coated using the embodiments described herein.

In one exemplary embodiment, nickel-coated graphite particles are coated onto a substrates such as a gob deflector chute, using a thermal spray process. The mechanical integrity of the thermal spray coating may be improved by subsequently adding a layer of electroless nickel, or electroless nickel and diamond (or cBN) to the outer structure of the thermal spray. In an embodiment, the thermal spray coating is quite porous; the composite electroless nickel/diamond coating may coat all of the surfaces of the nickel graphite particles even deep within the structure of the coating. Because of the porous nature, the coatings may be capable of retaining a considerable amount of water, which is a useful attribute for molten glass-contact surfaces in the glass industry. In addition to the porous nature of coating embodiments herein, the coated solid lubricant or graphite particles may also provide a non-wetting surface against the molten glass. This attribute may prevent the molten glass from sticking to the coating before it is quenched.

In a further embodiment, the composite coating is maintained at a relative thickness that is smaller than the size of the nickel graphite particles. In this embodiment, the overall coating may retain the porous structure even after the composite electroless nickel diamond is applied.

EXAMPLES

Figure 4A:
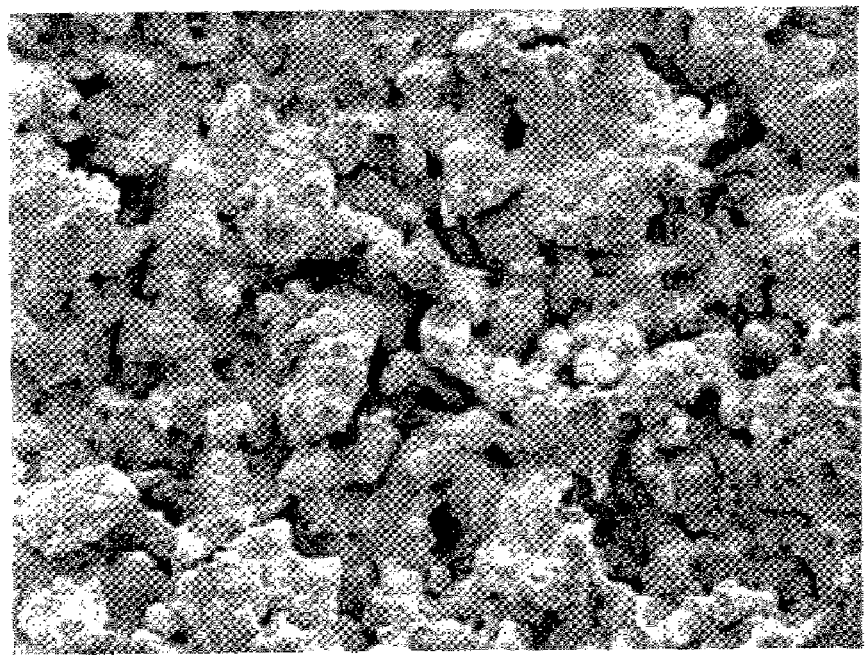
FIGS. 4A and 4B are scanning electron micrographs (100×) of embodiments of a coating.
Figure 4B:
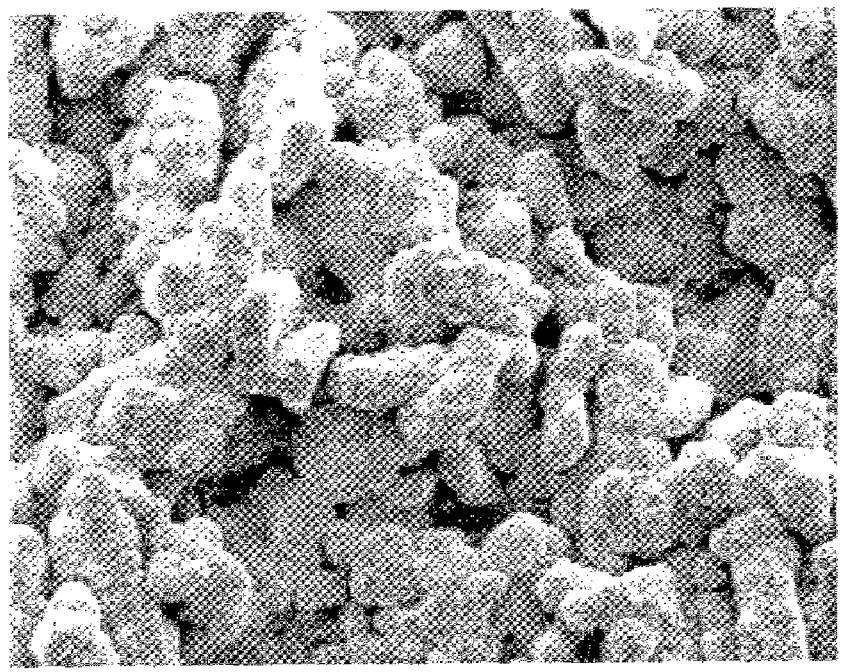

Referring to FIGS. 4A, and 4B, scanning electron micrographs (SEMs) of wear-resistant lubricious coatings according to embodiments of this invention are presented. Steel panels were coated with a nickel-graphite coating. Prior to coating, the surface of the panels were cleaned with alcohol to remove any surface grease and then were grit-blasted with a #30 aluminum oxide powder to induce surface roughness. A base layer of Metco 450 thermal spray coating was applied at approx. 0.002 inches for bonding of the nickel-graphite layer. The nickel-graphite powder used was 307NS commercially available from Sulzer Metco. This powder was applied using a Type 5P gun using oxy-acetylene gas with system parameters recommended by Sulzer Metco. The nickel-graphite layer was applied at 0.004 inches and 0.015 inches. The steel panels with the nickel graphite layer were further processed by applying a composite diamond coating such as described in U.S. Pat. No. 4,906,532 and applied commercially by Surface Technology Inc, Trenton, N.J. The composite coating in this example used an 8 micron diamond particle in an electroless nickel matrix. The thickness of the conforming composite diamond coating was about 20 microns. As can be seen from FIGS. 4A and 4B, the coated particles form a porous coating on the substrate.

Embodiments having a composite superabrasive coating layer may add abrasion resistance to the metal coated solid lubricant first layer. Abrasion resistance can be measure by Taber Wear Values derived from the Taber Wear Test, which is known to those skilled in the art. Taber Wear Values for a nickel graphite thermal spray coating and a nickel graphite thermal spray coating with an additional composite diamond coating (CDC) are provided in Table 1. Low values indicate better wear resistance. It is clear from the results in Table 1 that the CDC coating improves the abrasion or wear resistance of the nickel graphite thermal spray coating.

TABLE 1

Taber Wear Resistance Values for Nickel Graphite Thermal Spray Lubricious Coating and the Nickel Graphite Thermal Spray Coating with an Additional Composite Diamond Coating (CDC)

| Coating | Taber Wear Index (mg loss per 1000 cycles) |
|---|---|
| Nickel Graphite (NG) | 536 |
| NG + CDC | 21 |

High water retention on glass quench molds is a desirable quality for efficient forming of glass products. The water retention aids in the lubricity and release characteristics of glass quench molds and other glass forming equipment. A water retention test was developed to measure the water retention of substrates that could be used for glass molds, and to compare that water retention with that of a material currently used in the glass forming industry. The test entails weighing a test panel of size 2 by 3.5 inches, having the coating on one side, on a scale and tearing the scale to zero. The test panel is then dipped into water to a common level in a beaker of water. The panel is removed and excess water is shaken off, and the panel is immediately weighed. The weight of retained moisture is recorded. The panels are allowed to stand in an upright position for one minute and then re-weighed. The series of standing and weighing is repeated for seven minutes. The amount of water retained after seven minutes of testing is reported.

The wear resistant coatings with 50 µm sized graphite particles and 8 µm diamond particles (CDC-TS50), as depicted in FIG. 4A, and 100 µm graphite particles and 8 µm diamond particles (CDC-TS100), as depicted in FIG. 4B, together with a cork substrate were subjected to the water retention test. The results of the water retention test are presented in Table 2, and show that water retention of the embodied wear resistant lubricious coatings is comparable to the standard cork-resin coating used in current glass molding operations.

TABLE 2

Water Retention Test Results for Currently Used Materials for
Glass Quench Molds and for Wear-Resistant Lubricious Coatings

| Sample | Water Retention (grams) |
| --- | --- |
| Cork | 0.47 |
| CDC-TS50 | 0.33 |
| CDC-TS100 | 0.38 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A coating, comprising:
  a plurality of nickel-coated solid lubricant particles that are partially fused together, having a surface topography that includes a plurality of pores;
  wherein the pores comprise between about 20 and about 70 volume-percent of the coating; and
  a metallic matrix overlayer that substantially conforms to the surface topography;
  wherein the metallic matrix overlayer comprises a metal that is selected from the group consisting of nickel, chrome, cobalt, copper, and alloys thereof; and a plurality of particles.

2. The coating of claim 1, wherein the plurality of particles in the metal matrix comprises superabrasive particles.

3. The coating of claim 1, wherein the solid lubricant particles comprise graphite, hexagonal boron nitride, molybdenum disulfide, tungsten disulfide, mica, silver sulfate, cadmium iodide, lead iodide, fluorinated solids, copper, silver, nickel, lead, tin, indium, white lead, lime, talc, bentonite, a metallic salt, or mixtures thereof.

4. A coated article, comprising:
  a substrate;
  a plurality of nickel-coated solid lubricant particles that are partially fused together, having a surface topography that includes pores;
  wherein the pores comprise between about 20 and about 70 volume-percent of the coating; and
  a metallic matrix overlayer that substantially conforms to the surface topography;
  wherein the metallic matrix overlayer comprises a metal that is selected from the group consisting of nickel, chrome, cobalt, copper, and alloys thereof; and a plurality of particles.

5. The coated article of claim 4, wherein the solid lubricant particles comprise graphite, hexagonal boron nitride, molybdenum disulfide, tungsten disulfide, mica, silver sulfate, cadmium iodide, lead iodide, fluorinated solids, copper, silver nickel, lead, tin, indium, white lead, lime, talc, bentonite, a metallic salt, or mixtures thereof.

6. The coated article of claim 4, wherein the plurality of particles in the metal matrix comprises superabrasive particles.

* * * * *